US007826095B2

(12) United States Patent
Wang et al.

(10) Patent No.: US 7,826,095 B2
(45) Date of Patent: Nov. 2, 2010

(54) SYSTEM AND METHOD FOR ESTIMATING COLOR SEPARATION MISREGISTRATION UTILIZING FREQUENCY-SHIFTED HALFTONE PATTERNS THAT FORM A MOIRÉ PATTERN

(75) Inventors: Shen-Ge Wang, Rochester, NY (US); Charles Michael Hains, Altadena, CA (US); Jon S. McElvain, Manhattan Beach, CA (US)

(73) Assignee: Xerox Corporation, Stamford, CT (US)

( * ) Notice: Subject to any disclaimer, the term of this patent is extended or adjusted under 35 U.S.C. 154(b) by 961 days.

(21) Appl. No.: 11/653,800

(22) Filed: Jan. 16, 2007

(65) Prior Publication Data

US 2008/0170280 A1 Jul. 17, 2008

(51) Int. Cl.
*H04N 1/40* (2006.01)
*G06K 9/34* (2006.01)

(52) U.S. Cl. ..................................... 358/3.01; 382/162

(58) Field of Classification Search ................ 358/1.15, 358/3.01, 1.1, 1.9, 3.26, 504, 518, 3.13, 2.99; 382/162, 167; 713/340, 150, 161, 190, 300; 717/104, 124, 174; 356/328, 625; 347/5, 347/13, 49, 116; 399/301
See application file for complete search history.

(56) References Cited

U.S. PATENT DOCUMENTS 4,391,505 A 7/1983 Silverberg
4,546,700 A 10/1985 Kishner et al.
4,788,116 A 11/1988 Hochberg
4,831,420 A 5/1989 Walsh et al.
4,937,664 A 6/1990 Chiku et al.
5,081,507 A 1/1992 Monkelbaan et al.
5,184,011 A 2/1993 Hubble, III et al.
5,227,815 A 7/1993 Dastin et al.
5,260,725 A 11/1993 Hammond
5,272,493 A 12/1993 Hubble, III et al.
5,278,625 A 1/1994 Charnitski et al.

(Continued)

OTHER PUBLICATIONS

Hains, "The Influence of Halftone Orientation on Color Gamut", Recent Progress in Digital Halftoning, IS&T Pub. (1995).

(Continued)

*Primary Examiner*—Saeid Ebrahimi Dehkordy
(74) *Attorney, Agent, or Firm*—Carter, DeLuca, Farrell & Schmidt, LLP

(57) ABSTRACT

A method and system for estimating color separation misregistration of a printing system. The method may include marking a substrate to form a misregistration estimation patch. The misregistration estimation patch being formed by first and second color separations. The first color separation marking the substrate with a first halftone pattern. The first halftone pattern has a first halftone-frequency vector in a first direction and a second halftone-frequency vector in a second direction. The second color separation marking the substrate with a second halftone pattern. The second halftone pattern has a first halftone-frequency vector in a first direction and a second halftone-frequency vector in a second direction. The first and second halftone patterns form a moiré pattern. A deviation in at least one the halftone frequency vectors and/or the moiré pattern can be indicative of a color separation misregistration. The method also includes estimating the color separation misregistration of the printing system using the misregistration estimation patch.

8 Claims, 10 Drawing Sheets

U.S. PATENT DOCUMENTS 5,287,162 A 2/1994 de Jong et al.
5,329,466 A 7/1994 Monney
5,339,150 A 8/1994 Hubble, III et al.
5,339,159 A 8/1994 Nakamura et al.
5,342,715 A 8/1994 Kamath et al.
5,384,592 A 1/1995 Wong
5,406,066 A 4/1995 Steinle et al.
5,418,556 A 5/1995 Andrews
5,457,518 A 10/1995 Ashikaga et al.
5,523,823 A 6/1996 Ashikaga
5,526,140 A 6/1996 Rozzi
5,537,190 A 7/1996 Folkins et al.
5,572,601 A 11/1996 Bloomberg
5,574,527 A 11/1996 Folkins
5,600,404 A 2/1997 Ando et al.
5,631,686 A 5/1997 Castelli et al.
5,689,425 A 11/1997 Sainio et al.
5,760,815 A 6/1998 Genovese
5,768,671 A 6/1998 Komiya et al.
5,774,156 A 6/1998 Guerin
5,778,280 A 7/1998 Komiya et al.
5,793,901 A 8/1998 Matsutake et al.
5,808,658 A 9/1998 Hoover
5,825,984 A 10/1998 Mori et al.
5,887,996 A 3/1999 Castelli et al.
5,909,235 A 6/1999 Folkins
5,973,718 A 10/1999 Charnitski et al.
5,995,802 A 11/1999 Mori et al.
6,014,154 A 1/2000 Guerin
6,035,076 A 3/2000 Nagase
6,129,015 A 10/2000 Dewey
6,133,932 A 10/2000 Webb et al.
6,148,168 A 11/2000 Hirai et al.
6,154,628 A 11/2000 Kawano
6,164,847 A 12/2000 Allen
6,185,402 B1 2/2001 Linssen
6,198,490 B1 3/2001 Eom et al.
6,198,549 B1 3/2001 Decker et al.
6,198,550 B1 3/2001 Toyoda
6,215,512 B1 4/2001 Imaizumi et al.
6,236,470 B1 5/2001 Seachman
6,239,828 B1 5/2001 Ito et al.
6,246,857 B1 6/2001 Tanaka
6,253,678 B1 7/2001 Wentworth
6,275,244 B1 8/2001 Omelchenko et al.
6,288,556 B1 9/2001 Sato et al.
6,292,208 B1 9/2001 Lofhus et al.
6,295,435 B1 9/2001 Shinohara et al.
6,300,968 B1 10/2001 Kerxhalli et al.
6,310,681 B1 10/2001 Taniwaki
6,321,060 B1 11/2001 Nakayasu et al.
6,336,024 B1 1/2002 Kanaya et al.
6,369,842 B1 4/2002 Abramsohn
6,381,428 B1 4/2002 Yamamoto et al.
6,434,279 B1 8/2002 Shiba
6,441,915 B1 8/2002 Imaizumi et al.
6,449,060 B1 9/2002 Kawai et al.
6,456,310 B1 9/2002 Wallace et al.
6,456,311 B1 9/2002 Harush et al.
6,462,821 B1 10/2002 Borton et al.
6,493,010 B1 12/2002 Takahashi et al.
6,493,011 B1 12/2002 Shioya
6,493,064 B2 * 12/2002 Cabiri et al. .................. 355/53
6,493,083 B2 12/2002 Parisi et al.
6,526,240 B1 2/2003 Thomas et al.
6,529,616 B1 3/2003 Rasmussen et al.
6,556,313 B1 4/2003 Chang et al.
6,643,035 B1 11/2003 Salgado
6,644,773 B2 11/2003 Bildstein et al.
6,804,485 B2 10/2004 Martin et al.
6,842,590 B2 1/2005 Dalal et al.
6,856,336 B2 2/2005 Toyoda
6,889,028 B1 5/2005 Hunold et al.
6,909,516 B1 6/2005 Hoover
6,911,993 B2 6/2005 Nishikawa et al.
6,973,272 B2 12/2005 Yamamoto et al.
7,002,701 B1 2/2006 Nakayasu et al.
7,013,094 B2 3/2006 Dalal et al.
7,013,803 B2 3/2006 Hansen et al.
7,039,348 B2 5/2006 Kerxhalli et al.
7,071,957 B2 7/2006 Fujimoto
7,075,561 B2 7/2006 Ozawa et al.
7,085,009 B2 8/2006 Kawai et al.
7,100,508 B1 9/2006 Mader
7,106,477 B2 9/2006 Horobin
7,127,125 B2 10/2006 Perlmutter et al.
2001/0017645 A1 8/2001 Toda
2001/0021208 A1 9/2001 Ueyanagi
2001/0033395 A1 10/2001 Chizawa
2001/0033686 A1 10/2001 Klassen
2002/0102114 A1 8/2002 Kawanishi
2002/0113968 A1 8/2002 Parisi et al.
2002/0118350 A1 8/2002 Cabiri et al.
2002/0122124 A1 9/2002 Suda
2002/0159802 A1 10/2002 Katahira
2003/0002043 A1 1/2003 Abdulhalim et al.
2003/0044193 A1 3/2003 Thomas et al.
2003/0052959 A1 3/2003 Fujimoto
2003/0053093 A1 3/2003 Eom
2003/0090689 A1 5/2003 Klassen
2003/0098985 A1 5/2003 Horobin et al.
2003/0145745 A1 8/2003 Hansen et al.
2003/0145751 A1 8/2003 Hansen et al.
2003/0174184 A1 9/2003 Bildstein et al.
2003/0197877 A1 10/2003 Lee
2003/0214568 A1 11/2003 Nishikawa et al.
2004/0046981 A1 3/2004 Taka et al.
2004/0076450 A1 4/2004 Martin et al.
2004/0114025 A1 6/2004 Kerxhalli et al.
2004/0130737 A1 7/2004 Kamimura et al.
2004/0175196 A1 9/2004 Yamamoto et al.
2004/0239746 A1 12/2004 Ozawa et al.
2005/0047834 A1 3/2005 Tomita et al.
2005/0069220 A1 3/2005 Czyszczewski et al.
2005/0093956 A1 5/2005 Egan
2005/0111759 A1 5/2005 Perlmutter et al.
2005/0134874 A1 6/2005 Overall et al.
2005/0157297 A1 7/2005 Abdulhalim et al.
2005/0206934 A1 9/2005 Nishikawa et al.
2005/0206980 A1 9/2005 Nishikawa et al.
2005/0208685 A1 9/2005 Abdulhalim et al.
2005/0214037 A1 9/2005 Kishi
2006/0001765 A1 1/2006 Suda
2006/0005722 A1 1/2006 Nobukawa et al.
2006/0013603 A1 1/2006 Matsuyama
2006/0056882 A1 3/2006 Kwon et al.
2006/0065625 A1 3/2006 Abdulhalim et al.
2006/0114282 A1 6/2006 Mizes et al.
2006/0114283 A1 6/2006 Mizes et al.
2006/0115303 A1 6/2006 Kang et al.
2006/0119690 A1 6/2006 Park
2006/0120626 A1 6/2006 Perlmutter et al.
2006/0120772 A1 6/2006 Kitazawa et al.
2006/0132807 A1 6/2006 Abdulhalim et al.
2006/0139433 A1 6/2006 Yoshida
2006/0164506 A1 7/2006 Kitao
2006/0171748 A1 8/2006 Inui et al.
2006/0176354 A1 8/2006 Yoshida
2006/0176355 A1 8/2006 An
2006/0177246 A1 8/2006 Kawada et al.
2006/0182472 A1 8/2006 Munakata et al.
2006/0191437 A1 8/2006 Mader

| | | | |
|---|---|---|---|
| 2006/0244980 | A1 | 11/2006 | Grace |
| 2006/0262326 | A1 | 11/2006 | Abdulhalim et al. |
| 2006/0263120 | A1 | 11/2006 | Hayakawa |
| 2006/0275057 | A1 | 12/2006 | Suzuki |
| 2006/0290767 | A1 | 12/2006 | Tezuka et al. |
| 2007/0003332 | A1 | 1/2007 | Kim |
| 2007/0019056 | A1 | 1/2007 | Jung et al. |
| 2007/0048031 | A1 | 3/2007 | Kinoshita |
| 2007/0077059 | A1 | 4/2007 | Denoue et al. |
| 2007/0115339 | A1 | 5/2007 | Matsuzaki et al. |

OTHER PUBLICATIONS

Oztan et al., "Quantitive Evaluation of Misregistration Induced Color Shifts in Color Halftones", Electronic Imaging, vol. 5667, p. 225 (2000).

Yang et al., "Light Scattering and Ink Penetration Effects on Tome Reproduction", Pics 2000: Image Processing, Sys, Conf., Portland, OR, p. 225 (2000).

Arney et al., "Kubelka-Munk Theory and the MTF of Paper", Journ. of Imaging Science and Tech., vol. 47, No. 4, p. 339 (2003).

* cited by examiner

SYSTEM AND METHOD FOR ESTIMATING COLOR SEPARATION MISREGISTRATION UTILIZING FREQUENCY-SHIFTED HALFTONE PATTERNS THAT FORM A MOIRÉ PATTERN

BACKGROUND

1. Technical Field

The present disclosure relates to multi-color printing systems, and, in particular, to a system and method for characterizing misregistration between color separations in a multi-color printing system by utilizing a misregistration estimation patch formed by frequency-shifted halftone patterns that form a moiré pattern.

2. Description of Related Art

In most multi-color printing systems, such as xerographic color printers, multiple color separations are used for marking a substrate, e.g. paper. Usually each separation marks the substrate with only one specific colorant, which is different from colorants from other separations. The common combination of color separations are cyan, magenta, yellow and black, also referred to as CMYK. A separation can utilize "ink" and/or "toner" to mark a substrate, and for the purposes of the disclosed subject matter, the two terms can be used interchangeably.

It is well understood that most color printers operate in a binary mode, i.e., for each color separation, a corresponding color spot is either printed or not printed at a specified location or pixel, and halftone techniques control the printing of color spots. Spatially averaging the printed color spots of all the color separations by a human visual system provides the illusion of the required continuous color tones. The most common halftone method is screening, which compares the required continuous tone levels with predetermined threshold levels typically defined for a rectangular cell, or a halftone screen, that is tiled to fill the image plane. The output of the screening process is a binary pattern of multiple small "dots," which are regularly spaced as is determined by the size, shape, and tiling of the halftone screen. In other words, the screening output, as a two-dimensionally (2-D) repeated halftone pattern, possesses two fundamental spatial frequencies, which are completely defined by the geometry of the halftone screen.

Multi-color printing systems are susceptible to misregistration between color separations due to a variety of mechanical related issues. For example, the separations may be orientated differently in one direction or another due to the mechanical tolerances of the separations; also, vibration may create localized misregistration by moving slightly a separation in an undesirable fashion for a short time. Color separation misregistration may cause a significant color shift in the actual printed color that is noticeable to the human eye. Additionally, an unintentional "beating" pattern, or moiré pattern, may appear when viewing a printed image with color separation misregistration.

Moiré patterns are undesirable interference patterns that happen when two or more color halftone separations are printed over each other. Since color mixing during the printing process is a non-linear process, frequency components other than the frequencies of the individual color halftone separations can occur in the final printout. As a result, low frequency components might be visibly evident as pronounced moiré interference patterns in the halftone output. To avoid color moiré, different halftone screens are commonly used for different color separations, where the spatial directions of halftone patterns of different colors are separated by relatively large angles. Therefore, the frequency difference between any two frequency components of the different screens will be large enough so that no visibly objectionable moiré patterns are produced.

When using rotated halftone screens, the resulting halftone outputs are more robust to misregistration between different color separations. However, even in these cases, separation misregistration may be objectionable, particularly at the edges of texts or objects that contain more than one color. Therefore, it is important to characterize color separation misregistration in order to perform corrective action of these and other anomalies.

Various techniques have been used to attempt to estimate and/or characterize misregistration, such as using physical registration marks. In this approach, a digital file is created by placing vertically oriented lines of color separation A and color separation B, such that the head of the line corresponding to color separation B begins at the tail of color separation A. For an ideal printing device, this digital image would be perfectly replicated; however, for most real printing systems this is not the case, and misregistration between the two color separations A and B (in a direction perpendicular to the axis of the lines) will result in a visible displacement between the two lines in the horizontal direction. Using a flatbed scanner to scan the printed page and simple centroid analysis enables the estimation of misregistration at the location of the lines, in the direction perpendicular to the line axis. Sometimes, these physical registration marks are printed in the corner of the substrate so that microscopic (manual) examination may be facilitated. The same procedure can be repeated for lines oriented in the horizontal direction, and this can be used to measure misregistration in the vertical direction. With the printer speeds and smaller cluster dot sizes now possible there is a need to estimate and characterize misregistration between separations to mitigate or eliminate unwanted artifacts such as moiré patterns, color shifts and/or anomalies at color boundaries.

SUMMARY

The present disclosure relates to multi-color printing systems, and, in particular, to a system and method for characterizing misregistration between color separations in a multi-color printing system by utilizing a misregistration estimation patch formed by frequency-shifted halftone patterns that form a moiré pattern.

In another aspect thereof, the present disclosure relates to a method for estimating color separation misregistration of a multi-color printing system. The multi-color printing system may be an electrostatographic system or a xerographic system. The method includes marking a substrate to form a misregistration estimation patch. The estimation patch may be formed on substantially the entire printable region of the substrate. The patch is formed by two separations. The first separation marks the substrate with a first halftone pattern and may have an approximately constant contone value. The first halftone pattern may be a cluster-dot halftone pattern. The first halftone pattern has a first halftone-frequency vector in a first direction and a second halftone-frequency vector in a second direction. The second separation also marks the substrate with a second halftone pattern that may have an approximately constant contone value. The second halftone pattern may also be a cluster-dot halftone pattern. Additionally, the second halftone pattern has a first halftone-frequency vector in a first direction and a second halftone-frequency vector in a second direction. If the first and second screens are different in frequency, the two separations may form a moiré pattern that will exhibit periodic color variations with peaks and valleys at specific locations on the test patch. A deviation in the position of these peaks and valleys of the moiré pattern can be indicative of a local color separation misregistration, and hence misregistration may be detectable and/or measurable using this method. The methodology also includes estimating the misregistration of the printing system using the misregistration estimation patch. This may be done by a scanner or by a human visualizing the misregistration estimation patch.

Estimating the color separation misregistration of the multi-color printing system using the misregistration estimation patch may include measuring at least one characteristic of the misregistration estimation patch. The characteristics included are color, a shift of the moiré pattern, chroma, luminance, a chroma min and/or max, and a luminance min and/or max. Additionally or alternatively, scanning the misregistration estimation patch and processing the scanned misregistration estimation patch may also be included in the step of estimating the color separation misregistration of the printing system using the misregistration estimation patch.

The first direction of the first halftone-frequency vector of the first halftone pattern may be approximately equal to the first direction of the first halftone-frequency vector of the second halftone pattern. Additionally or alternatively, the second direction of the first halftone-frequency vector of the first halftone pattern may be approximately equal to the second direction of the second halftone-frequency vector of the second halftone pattern. The first and second halftone-frequency vectors of the first halftone pattern may have a frequency of 50 dots per inch, and the first and second halftone-frequency vectors of the second halftone pattern may have a frequency of about 51 dots per inch.

Additionally or alternatively, the step of estimating color separation misregistration using the misregistration estimation patch may comprise generating a data structure representing the color separation misregistration of the printing system. The data structure may be configured to modify at least one digital file in accordance with the color separation misregistration. Also, the methodology may further include modifying at least one digital file in accordance with the color separation misregistration. The methodology may further include adjusting trap settings of the printing system according to the estimated color separation misregistration. Additionally or alternatively, the method may include adjusting at least mechanical setting of the printing system in accordance with the estimated color separation misregistration.

In another aspect thereof, the present disclosure relates to a color separation misregistration system. The system may be a module installable in an electrostatographic machine or a xerographic machine. The system may include a communication module and/or an analysis module. The communication module has a first operative set of processor executable instructions and may be configured to receive a misregistration estimation patch raw data structure relating to a misregistration estimation patch marked on a substrate. The misregistration estimation patch may be formed by first and second color separations. The first color separation may mark the substrate with a first halftone pattern having a first halftone-frequency path in a first direction and a second halftone-frequency path in a second direction. Additionally, the second color separation may mark the substrate with a second halftone pattern that has a first halftone-frequency vector in a first direction and a second halftone-frequency vector in a second direction. The two separations may form a moiré pattern. The first and/or second halftone patterns may have a constant contone value; and the first and/or second halftone pattern may be a cluster-dot halftone pattern. Also, any deviation in at least one of the four halftone frequency vectors of the misregistration estimation patch can be indicative of a color separation misregistration. A shift of the moiré pattern can also be indicative of a color separation misregistration.

Also, the system may include an analysis module having a second operative set of processor executable instructions. The analysis module may be operatively connected to the communication module. The analysis module may be configured to estimate color separation misregistration by processing the misregistration estimation raw data structure and generating a misregistration estimation processed data structure corresponding to a characterization of the color separation misregistration. The analysis module may processes the misregistration estimation raw data structure by measuring at least one of color, chroma, luminance, a chroma minimum, a chroma maximum, a luminance minimum, a luminance maximum and a shift of a moiré pattern of the misregistration estimation patch marked on the substrate as provided in the misregistration estimation raw data structure.

Additionally or alternatively, the misregistration estimation processed data structure may be configured to be utilized in an algorithm and to modify at least one digital image file in accordance with the estimated color separation misregistration. Also, the misregistration estimation processed data structure may be configured to provide at least one mechanical setting adjustment of the printing system or may be configured to provide trap settings of the printing system in accordance with the estimated color separation misregistration.

The system may also include a printing control module having a third operative set of processor executable instructions and may be configured to control the marking of the misregistration estimation patch on the substrate by utilizing the first and second color separations.

Additionally or alternatively, a scanner module may be included with the system and may be configured to scan the misregistration estimation patch to generate the misregistration estimation raw data structure. The scanner module may also be configured to operatively communicate the misregistration estimation raw data structure to the communication module.

In another aspect thereof, the present disclosure relates to a system for characterizing color separation misregistration that includes a color separation estimation module that may be operatively configured to estimate color separation misregistration by measuring a color separation estimation patch. The color separation estimation patch may be formed by marking a substrate by at least two color separations where at least one of the at least two color separation may mark the substrate with at least one halftone pattern. The two color separations may form a moiré pattern.

BRIEF DESCRIPTION OF THE DRAWINGS

These and other advantages will become more apparent from the following detailed description of the various embodiments of the present disclosure with reference to the drawings wherein.

DETAILED DESCRIPTION

The word "exemplary" is used herein to mean serving as an example, instance and/or illustration rather than serving as a preferred, desired, or superior embodiment.

Figure 1:
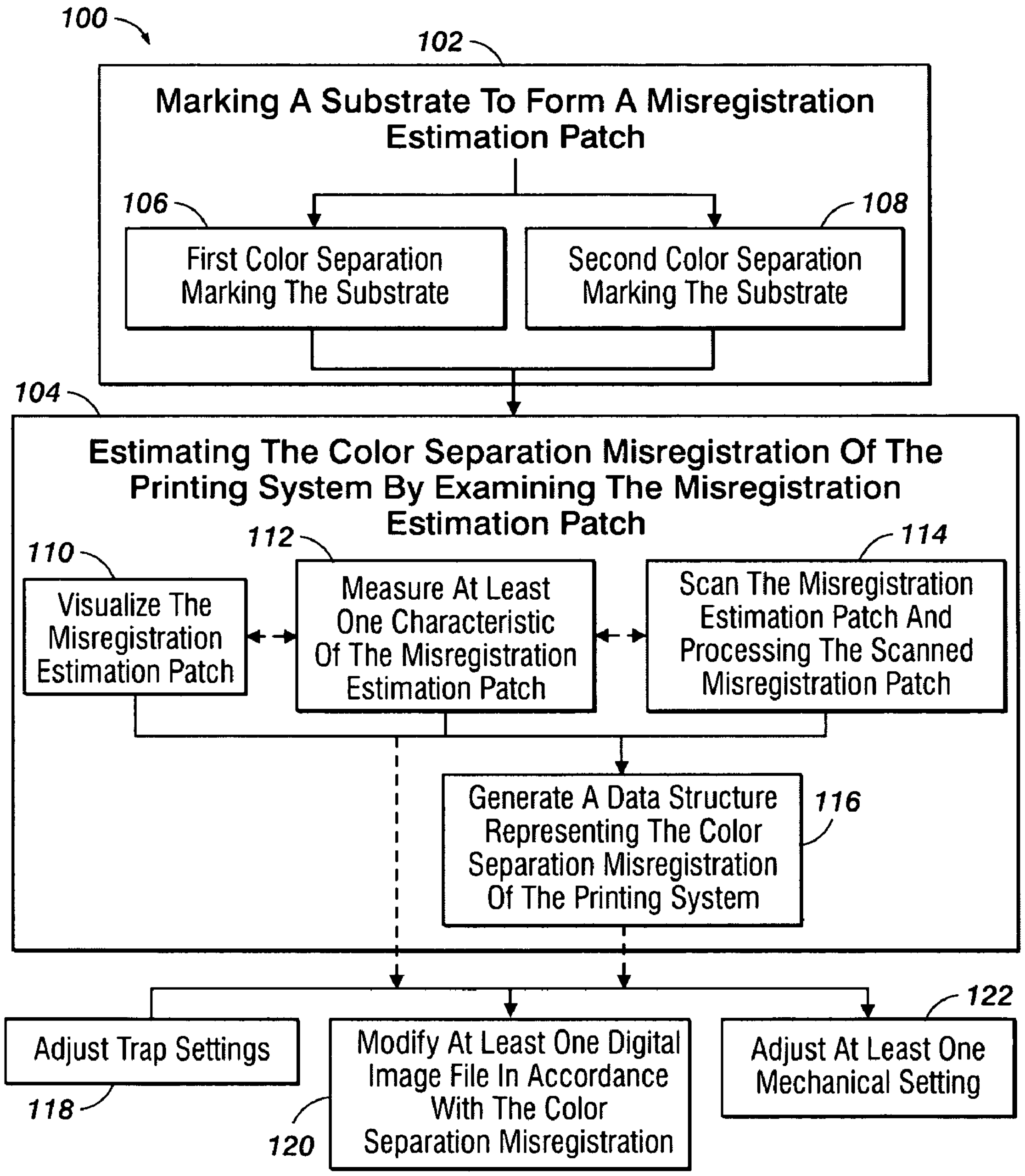
FIG. 1 is a flow chart illustrating a methodology for estimating color separation misregistration in accordance with the present disclosure.

Referring now to FIG. 1, one embodiment of a method for estimating color separation misregistration of a printing system in accordance with the present disclosure is illustrated in flow chart format. Although method 100 is depicted as a flow chart, it is not intended to limit the methodology to a particular ordering that may be inferred from FIG. 1. Method 100 as illustrated may be carried out in multiple manners, for example: within a printing system, e.g. a electrostatographic system and/or a xerographic system, as a separate set of components and/or modules outside of a printing system, as part of a computer system, as a stand-alone computer system, as a module installable into another device, and/or manually. Act 102 is marking a substrate to form a misregistration estimation patch; and act 104 is estimating the color separation misregistration of the printing system using the misregistration estimation patch. The substrate may be a piece of paper, or other printable medium, e.g. a transparency. Also, the patch may occupy the entire printable region of the substrate, for example the entire printable region of a piece of paper.

Act 102 may include act 106 and 108. Act 106 is the first color separation marking the substrate with a first halftone pattern with a first and second halftone-frequency path in a first and second direction, respectively; and act 108 is the second color separation marking the substrate with a second halftone pattern with a first and second halftone-frequency path in a first and second direction. Thus, the first color separation marks the first halftone pattern and the second color separation marks the second halftone pattern. The first and/or second halftone pattern may be a cluster-dot pattern and may have a constant contone value. Also, act 106 and/or act 108 may mark the substrate with a cyan, magenta, yellow, and/or black color separation forming a respective color halftone pattern. Acts 106 and/or 108 may utilize cluster-dots, line patterns, other periodic patterns, or some combination thereof.

Act, 106 and 108 may occur simultaneously or serially. Additionally or alternatively, act, 106 and 108 may occur in a step-wise fashion, e.g., act 106 may mark only a portion of the first halftone pattern to partially form a patch, then act 108 may proceed to mark only a portion of the second halftone pattern to further progress in forming the patch, next act 106 may continue marking to even further form the patch, and the back and forth markings between act 106 and 108 may not stop until the entire patch is formed.

Figure 2:
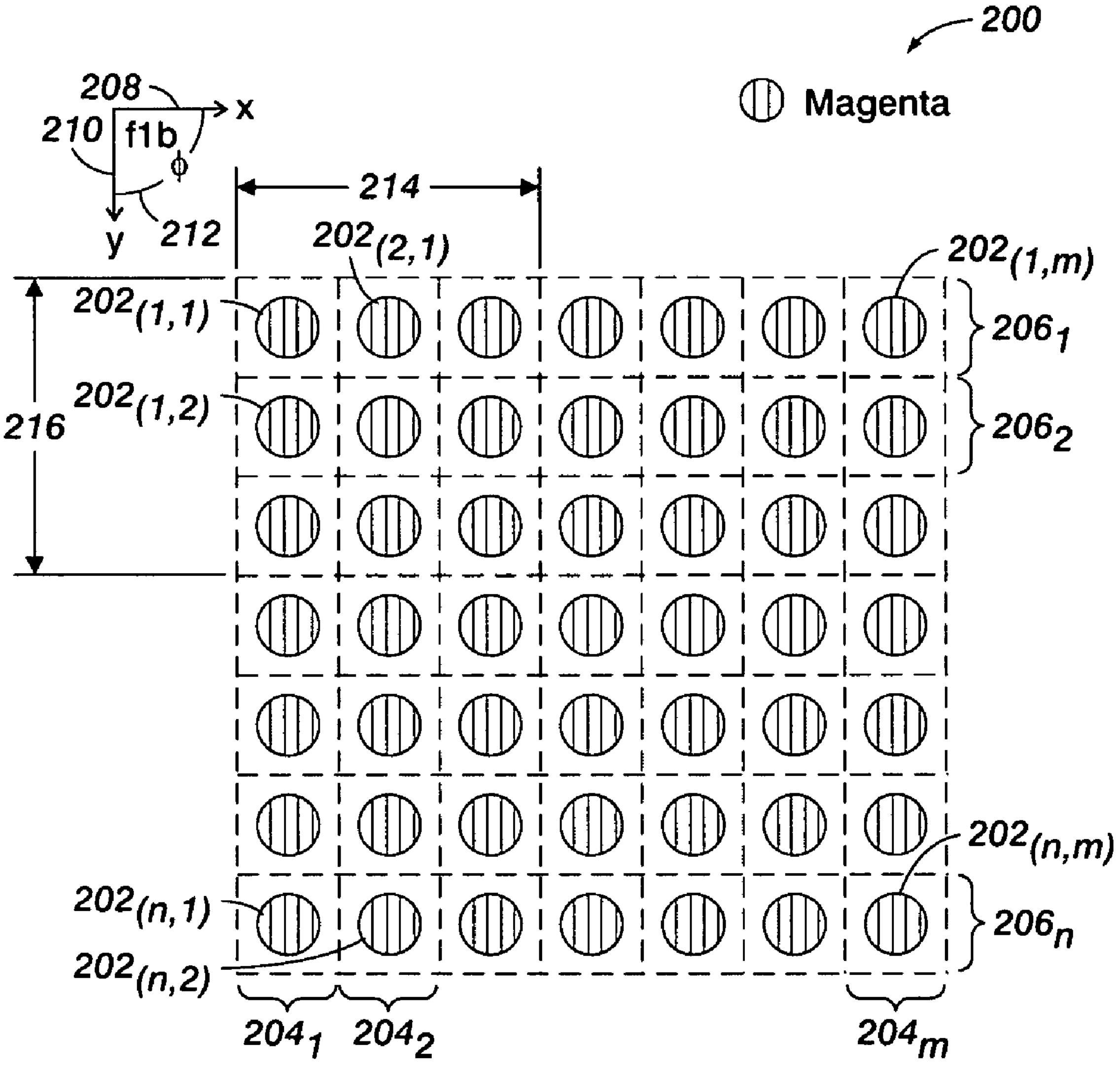
FIG. 2 is a drawing of a close-up graphic of a magenta cluster-dot halftone pattern marked by a magenta separation in accordance with the present disclosure.

As mentioned supra, act, 106 and 108 mark two halftone patterns on a substrate. Referring now to FIG. 2, a close-up view of a cluster-dot halftone pattern 200 that may be marked during either act 106 or 108 is depicted, thus halftone pattern 200 may be marked by either the first or second color separation. Halftone pattern 200 is formed by a magenta color separation, and thus is a magenta cluster-dot halftone pattern. Cluster-dot halftone pattern 200 is formed by cluster-dots 202, such as cluster-dot $\mathbf{202}_{(1,1)}$.

The aggregation of the cluster-dots (of FIG. 2) form cluster-dots 202. Cluster-dot halftone pattern 200 has multiple constant contone-value cluster-dots arranged in a grid-like fashion and labeled using the following format: cluster-dot $\mathbf{202}_{(row,\ column)}$. "Row" refers to the consecutive cluster-dot placement along the vertical axis while "column" refers to consecutive cluster-dot placement along the horizontal axis, where the words "row" and "column" are replaced with numbers to indicate their respective placement. The maximum number of "rows" is indicated by a variable "n" while the maximum number of "columns" is indicated by a variable "m", which is 6 and 7, respectively, in FIG. 2. The use of variables in place of numbers of rows and/or columns for referencing the cluster-dots of cluster-dot halftone pattern 200 is to illustrate that any operatively sufficient number of cluster-dots is possible. Cluster-dots columns $\mathbf{204}_1$ through $\mathbf{204}_m$ are shown, where the subscript denotes the relative column, e.g. cluster-dots $\mathbf{202}_{(2,1)}$ through $\mathbf{202}_{(n,1)}$ form cluster-dot column $\mathbf{204}_2$. Additionally, cluster-dots rows $\mathbf{206}_1$ through $\mathbf{206}_n$ are shown and are formed by their respective cluster-dots, e.g. cluster-dots $\mathbf{202}_{(n,1)}$ through $\mathbf{202}_{(n,m)}$ form row $\mathbf{206}_n$.

Cluster dots 202 form halftone pattern 200; and halftone pattern 200 has the properties, as illustrated by two arrows, of a halftone-frequency path 208 and a halftone-frequency path 210. Halftone-frequency path 208 is the general direction that rows $\mathbf{206}_1$ through $\mathbf{206}_n$ follow. For example, cluster-dots $\mathbf{202}_{(1,1)}$ through cluster-dot $\mathbf{202}_{(1,m)}$ are all lined up in the same general direction, as depicted by the arrow representation of halftone-frequency path 208. Additionally, columns $\mathbf{204}_1$ through $\mathbf{204}_m$ generally follow the direction of the arrow representation of halftone-frequency path 210. For example, cluster-dots $\mathbf{202}_{(1,1)}$ through $\mathbf{202}_{(n,1)}$ that form column $\mathbf{204}_1$ are generally parallel with the arrow direction that represents halftone-frequency path 210. Also, angle 212 depicts the angle between halftone-frequency paths 208 and 210. Halftone pattern 200 has angle 212 being approximately at 90 degrees.

Additionally, halftone pattern 200 has two additional properties that are related to halftone-frequency paths 208 and 210. Halftone-frequency paths 208 and 210 have the respective property of "halftone frequency". The halftone frequency of halftone frequency path 208 is depicted by $f1_a$. To illustrate this property, a unit distance 214 is shown as well as unit distance 216. Halftone-frequency path 208, as depicted, has a halftone frequency of 3 cluster-dots per unit; which is illustrated by cluster dots $\mathbf{202}_{(1,1)}$, $\mathbf{202}_{(1,2)}$, and $\mathbf{202}_{(1,3)}$ all being with unit distance 214 within row $\mathbf{206}_1$. Thus, for every unit distance 214 along a row 206, there will be approximately 3 cluster dots per unit length. Also, halftone-frequency path 210 has a halftone-frequency of 3 cluster-dots per unit as is illustrated by cluster dots $\mathbf{202}_{(1,1)}$, $\mathbf{202}_{(1,2)}$, and $\mathbf{202}_{(1,3)}$ all being within unit distance 216. Halftone frequency path 210 has a frequency that is represented by $f1_b$. Halftone pattern 200 has halftone frequencies $f1_a$ and $f1_b$, which are approximately equal to each other in value (note the two variables include the same number "1", while the letters "a" and "b" denote their differences in direction, i.e., halftone frequency path 208 has a halftone frequency of $f1_a$ which is approximately equal in magnitude to halftone frequency $f1_b$ of halftone path 210.) Frequencies $f1_a$ and $f1_b$ are considered to have a frequency value of f1.

Referring again to FIG. 1, act 102 may include acts 106 and/or 108. Acts 106 or 108 may mark a cluster-dot halftone pattern with a constant contone value, as depicted in FIG. 2. Additionally, another cluster-dot halftone pattern may be marked with differing properties. For example, if halftone pattern 200 (see. FIG. 2) is marked on a substrate in act 106, act 108 may additionally mark a differing cluster-dot halftone pattern with a constant contone value with yet another color separation, e.g., with a cyan, yellow, or black color separation forming a cyan, yellow or black cluster-dot halftone pattern, respectively. Two cluster-dot halftone patterns may be used to form a moiré pattern.

Figure 3:
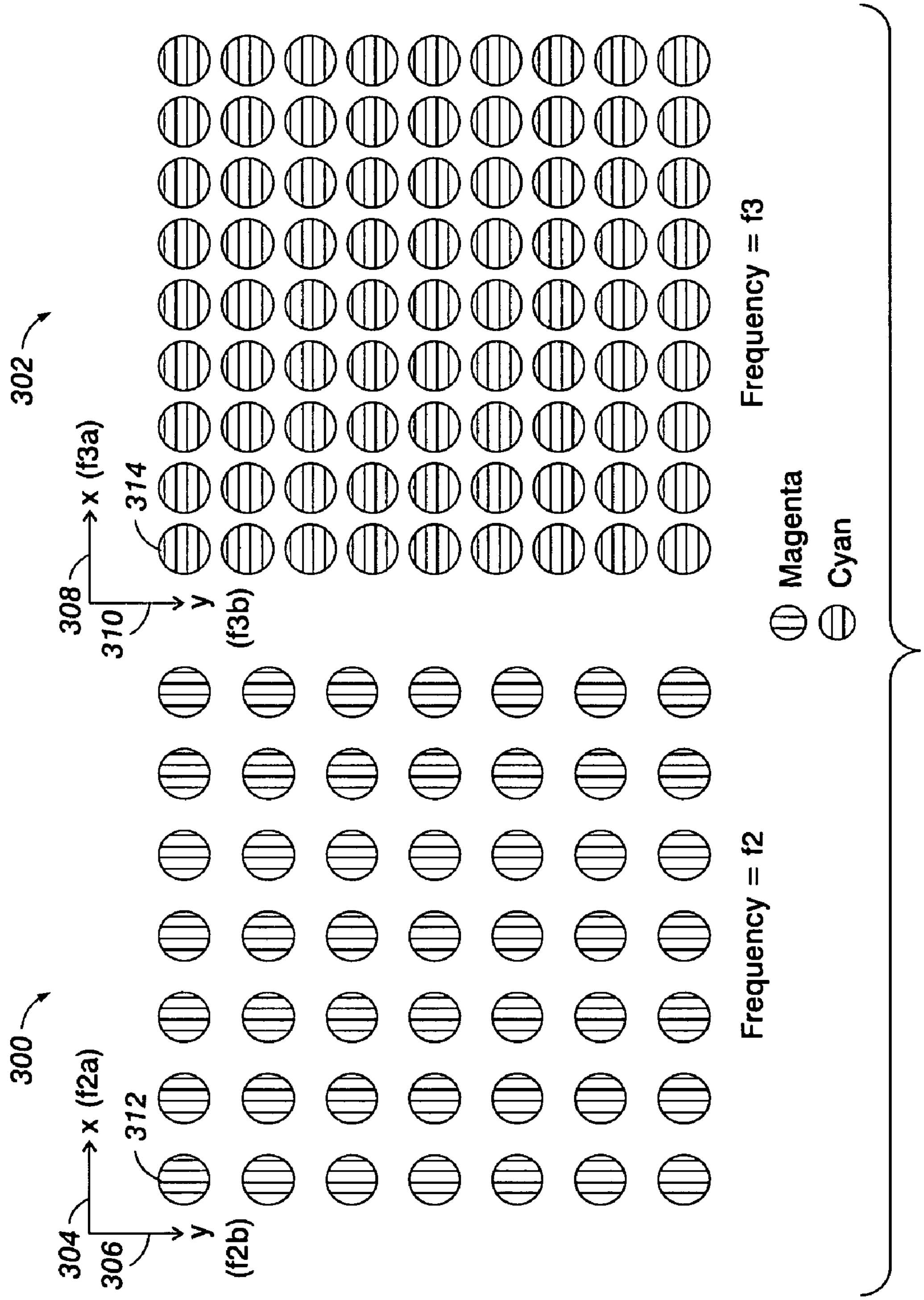
FIG. 3 illustrates two side-by-side close-up views of a magenta cluster-dot halftone pattern marked by a magenta color separation and a cyan cluster-dot halftone pattern marked by a cyan color separation to illustrate aspects of a color separation misregistration estimation in accordance with the present disclosure.

Referring now to FIG. 3, cluster-dot halftone patterns 300 and 302 are shown in a close-up view and side-by-side. Halftone pattern 300 is a magenta halftone pattern marked by a magenta color separation; and halftone pattern 302 is a cyan halftone pattern marked by a cyan color separation. Although halftone patterns 300 and 302 are shown side-by-side, this is not how a misregistration estimation patch is formed, but rather, halftone patterns 300 and 302 are shown in a side-by-side manner to illustrate the differences between act 106 and 107 (see FIG. 1).

Halftone pattern 300 has halftone-frequency paths 304 and 306; and paths 304 and 306 have a halftone frequency of f2*a* and f2*b*, respectively. The halftone frequency is fairly constant throughout halftone pattern 300. Additionally, the halftone frequency of halftone frequency path 304 is about the same as the halftone frequency of halftone frequency vector 306. For illustrative purposes only, assume that the halftone frequencies of halftone frequency vectors 304 and 306 are approximately equal to f2. Additionally, halftone pattern 302 has halftone frequency vectors 308 and 310; and a halftone frequency of f3*a* and f3*b*, respectively. The halftone frequency of halftone frequency vector 308 is approximately equal to the halftone frequency of halftone frequency vector 310, which we will refer to as f3.

Halftone patterns 300 and 302 are to illustrate that two differing halftone patterns are used to mark a substrate to form a patch where two color separations are used to mark each respective halftone pattern. Also the two frequencies of halftone patterns 300 and 302 are not the same, such as in the example shown in FIG. 3, where f2 and f3 have differing frequencies. FIG. 3 shows halftone pattern 302 as having a frequency f3, which has a higher value than frequency f2 of halftone pattern 300. Referring simultaneously to FIGS. 1 and 3, notice that to form a misregistration estimation patch, act 106 marks the substrate and act 108 marks the substrate. Act 106 marks the substrate with a color separation with a halftone frequency, such as $f_2$ as shown in halftone pattern 300, and act 108 marks the substrate with a different color separation with another halftone frequency, such as $f_3$ as shown in halftone pattern 302.

To form a misregistration estimation patch the halftone patterns must have at least one differing halftone-frequency path. Utilizing a frequency difference of at least one differing halftone-frequency path may create a moiré pattern. This moiré pattern may be used to estimate color separation misregistration; and this moiré pattern may be described as a "beating pattern" occurring as a result of the aforementioned frequency difference. The utilization of a moiré pattern to estimate color separation misregistration is described in more detail infra. For the description of FIG. 4 that follows, note cluster-dot 312 of halftone pattern 300 and cluster-dot 314 of halftone pattern 302.

When two halftone patterns are used to form a color separation misregistration estimation patch, two halftone patterns are marked on top of each other. For example, refer now to FIG. 4. A color separation misregistration estimation patch 400 is shown and is formed by two color separations each marking a separate cluster-dot halftone pattern. Estimation patch 400 can be formed by the aggregation of halftone patterns 300 and 302 (shown in FIG. 3); as a consequence, a moiré pattern (beating pattern) is formed. The two halftone patterns are aligned by cluster-dot set 402 which is formed by two color separations marking a dot on top of the other dot, thus the two cluster-dot halftone patterns are aligned together by the top left dot on top of the other left top dot of each respective halftone pattern.

Figure 4:
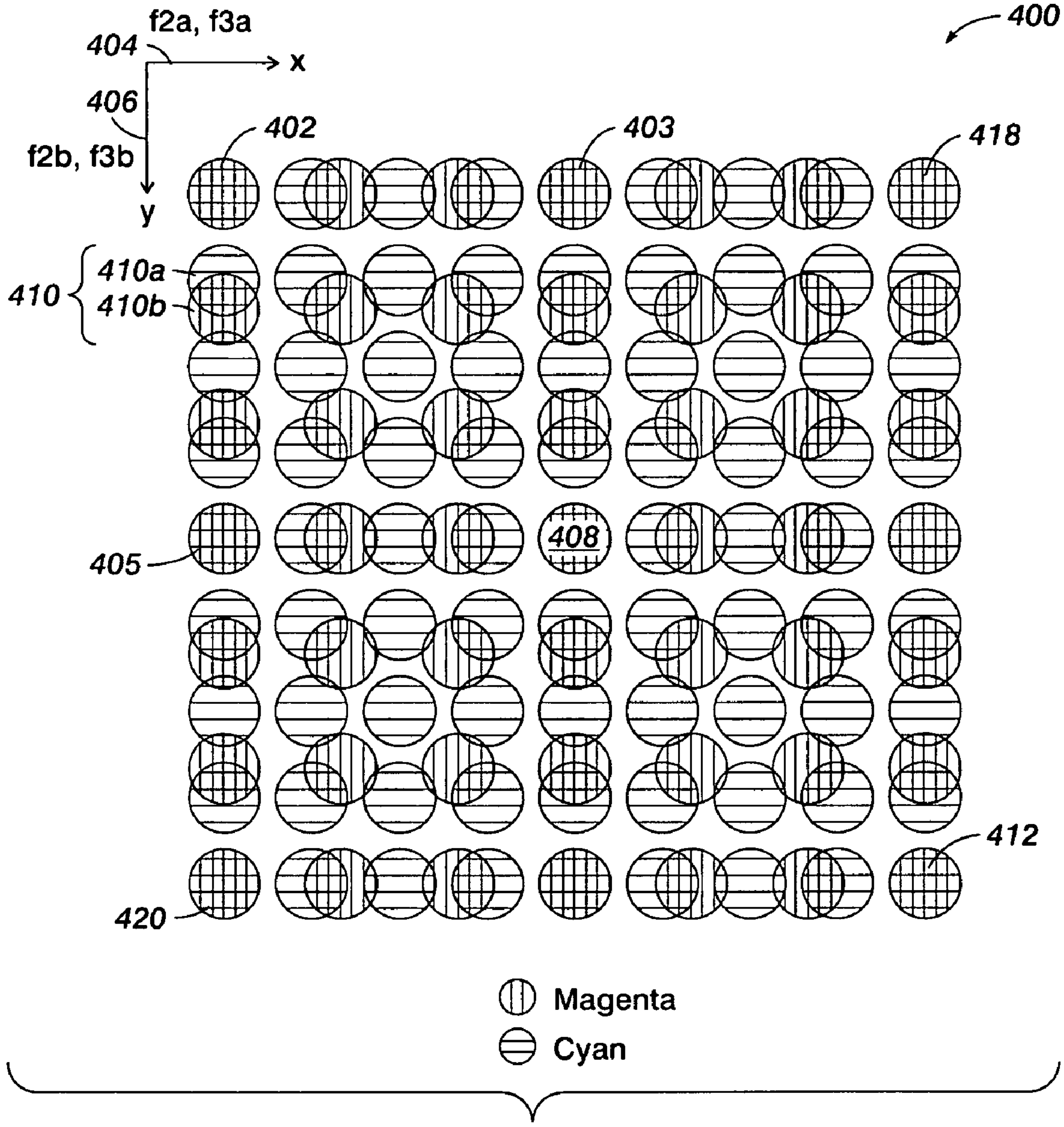
FIG. 4 is a drawing of a close-up view of a misregistration estimation patch forming a moiré pattern, the patch is formed by a magenta halftone pattern and a cyan halftone pattern, and illustrates an color-separation misregistration estimation patch with an absence of color separation misregistration, in accordance with the present disclosure.

Referring to FIGS. 3 and 4 simultaneously, cluster-dot set 402 may be, for example, the aggregation of cluster-dot 312 of halftone pattern 300 and cluster-dot 314 of halftone pattern 302. Since cluster dot 312 is magenta and cluster-dot 314 is cyan, the aggregation of the two cluster-dots can form a "blue" cluster-dot set 402. The term "set" is used only to point out that the items may be formed by two dots, although, it may only appear as a unitary dot with a different color from the two individual cluster-dots. The magenta halftone patterns frequency paths 404 and 406 which have halftone frequencies f2*a* and f2*b*, respectively; assume frequencies f2*a* and f2*b* are approximately equal to f2. Also, patch 400 has a cyan halftone pattern with frequency paths 404 and 406, with halftone frequencies f3*a* and f3*b*, respectively; also assume frequencies f3*a* and f3*b* are approximately equal to f3.

One of the color separations has a halftone frequency $f_1$ of halftone-frequency vectors 404 and 406, while the other color separation has a halftone frequency $f_2$ of halftone frequency vectors 404 and 406. The two halftone patterns create a beating pattern of dot-on-dot and dot-off-dot. Note the periodic pattern that is formed, for example cluster-dot set 402, 408 and 412 are "blue". Note that the period pattern moves at a 45 degree angle down from the x-axis. Also, note that a periodic pattern formed by cluster dot sets 402, 403 along the x-axis; and a periodic pattern forms by cluster dot sets 402, 405, and 420.

The patterns aren't limited to full dot-on-dot sets or full dot-off-dot sets. For example consider dot set 410 which is composed of cyan cluster-dot 410*a* and magenta cluster-dot 410*b*. In any direction along any portion of patch 400, a periodic pattern is formed and is called herein a "moiré pattern". A periodic pattern is not only formed by differing colors of cluster-dot sets, but a periodic pattern is also formed by chroma and luminance. The luminance and/or chroma varies in certain regions because, certain portions of patch 400 contain less cluster dots area and certain areas contain less cluster dots area, thus the "area coverage" of cluster-dots vary, i.e., the percentage of the area that cluster-dots occupy over the substrate when viewed form a sufficient distance.

The varying chroma, luminance and colors associated with using the differing frequencies can create a moiré pattern that is observable by examining chroma, luminance, and/or colors from a sufficient distance. When viewing a patch from a sufficient away from a misregistration estimation patch, the cluster-dots may seem to blur together, so that the misregistration estimation patch appears more "continuous" and "uniform" and less "discrete" (an example of this effect may be visually noted by viewing FIG. 8, which is described in more detail infra.).

Again, note that FIG. 4 illustrates a misregistration estimation patch with no color separation misregistration.

Figure 5:
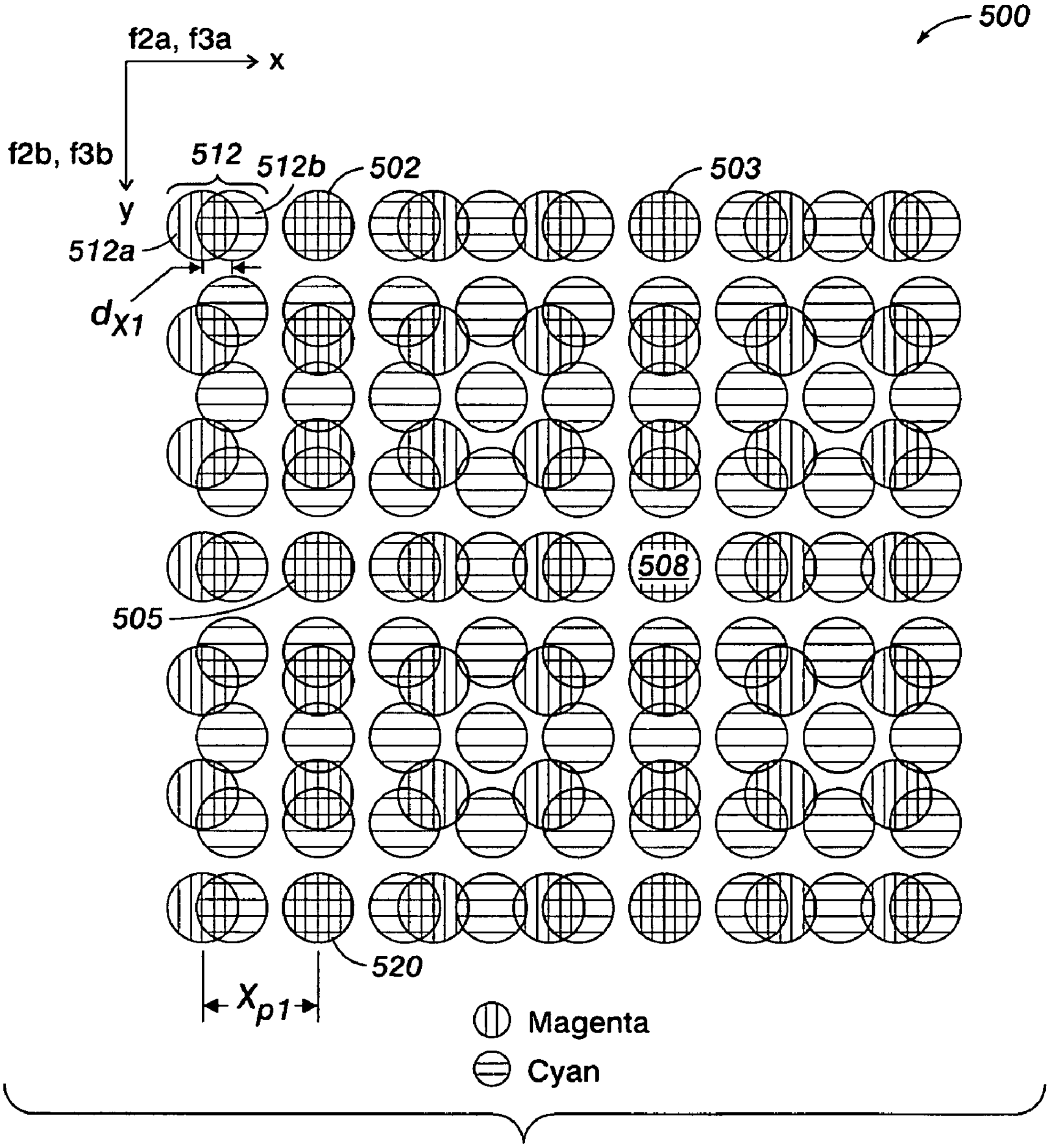
FIG. 5 is a drawing of a close-up view of a misregistration estimation patch formed by a magenta halftone pattern and a cyan halftone pattern, illustrating color separation misregistration along the x-axis in accordance with the present disclosure.

FIG. 5 shows a misregistration estimation patch 500 as actually printed on a substrate in which color separation misregistration occurs. When acts 106 and 108 mark a substrate, acts 106 and 108 attempt to mark a misregistration patch 400 as shown in FIG. 4, but because of (usually unintentional, but not always) color separation misregistration occurring along the x-axis in FIG. 5, the misregistration estimation patch 500 has several differences than the misregistration estimation patch 400.

Now turn simultaneously to only FIGS. 4, and 5. In FIG. 5, a color separation of distance $dX_1$ has occurred along the x-axis. This color separation misregistration may either be a color separation misregistration of the cyan halftone pattern in the positive x direction, or, a color separation misregistration of the magenta halftone pattern in the negative x direction. Assume, that the color separation misregistration, for simplicity only, occurred by the cyan halftone pattern shifting in the positive x direction by distance $dX_1$.

Note that the locations in which the dots are wholly overlapping to form cluster-dot sets of the color "blue" occurs at cluster-dot sets 502, 503, 505, 508, and 520. Also note their locations relative to cluster-dot sets 402, 403, 405, 408, and 420; respectively. The locations in which the cluster-dot sets are formed by a magenta cluster-dot and a cyan cluster-dot wholly overlapping have all occurred at distance shift of $Xp_1$.

Also, note that cluster-set 512 is now not formed by the overlapping of magenta cluster-dot 512*a* and cyan cluster-dot 512*b* such as cluster-dot set 402 in FIG. 4. Rather cluster-dot set 512 is formed by magenta cluster-dot 512*a* and cyan cluster-dot 512*b* only partially overlapping. A shift in the entire moiré pattern has occurred between FIG. 4 and FIG. 5 of distance $Xp_1$. Thus, a color separation misregistration of dX1in the positive x direction has resulted in a shift in the entire moiré pattern by a distance Xp1 in the positive x direction. The misregistration has been "amplified" by the moiré pattern, and can be characterized by equation (1):

$$Amplification_{(x\text{-}direction)} \approx \frac{Xp_1}{dX_1}. \tag{1}$$

Also note that no color separation misregistration occurred in the y direction and no shift resulted of the moiré pattern in the y direction.

Figure 6:
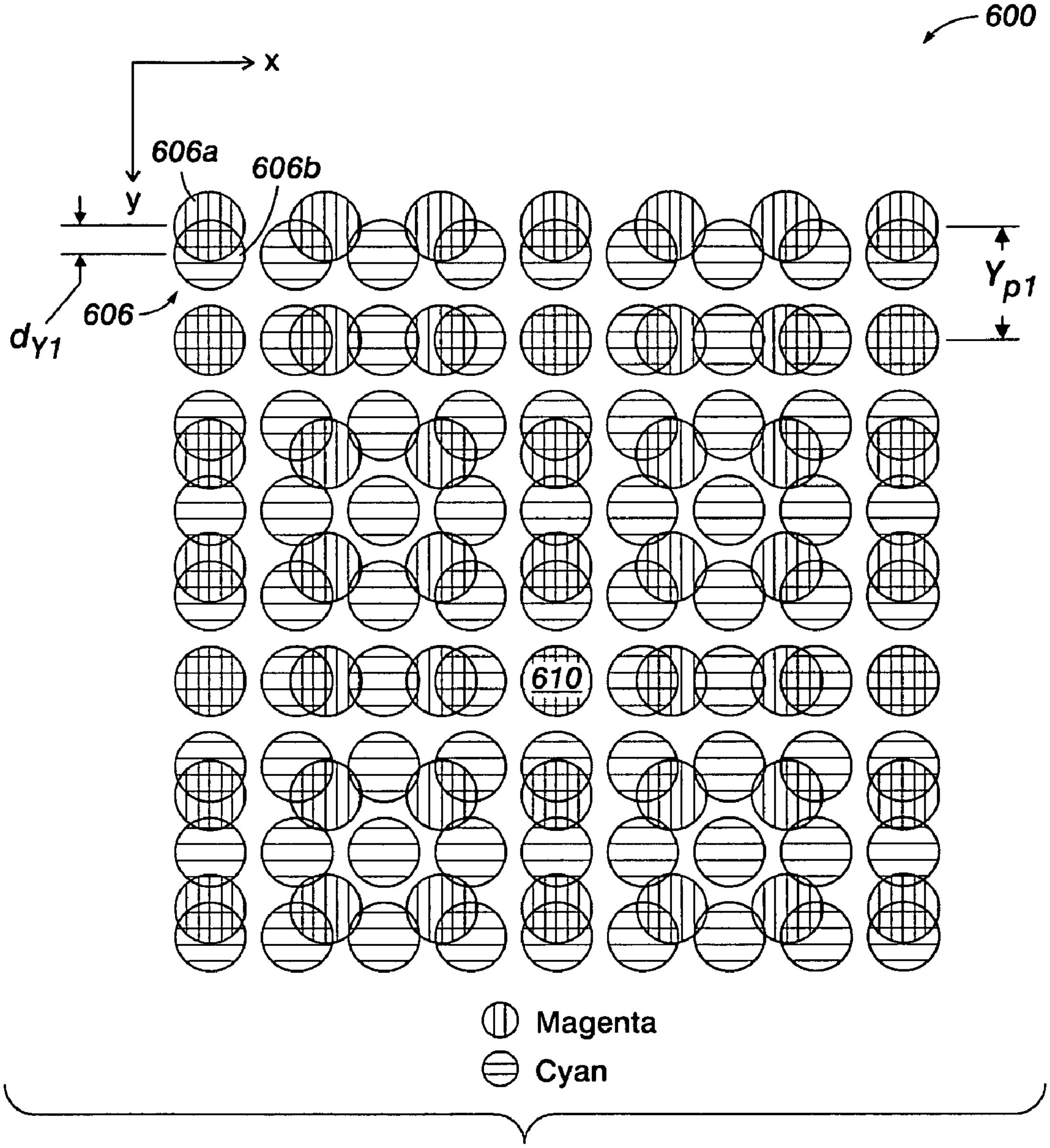
FIG. 6 is a drawing of a close-up view of a misregistration estimation patch formed by a magenta halftone pattern and cyan halftone pattern, illustrating color separation misregistration along the y-axis in accordance with the present disclosure.

Now refer simultaneously to FIGS. 4 and 6. FIG. 6 depicts a color separation misregistration in the negative y direction of the cyan halftone pattern. Note that a misregistration of distance dY1 of the cyan halftone pattern has resulted in a negative y shift of the moiré pattern in the negative y direction of a distance $Yp_1$. Also, not that cluster-dot set 408 of FIG. 4 has been shifted by distance Yp1 in the negative direction to a location of cluster-dot set 610. Also note that cluster-dot set 606 is a non-overlapping of cluster-dots 606*a* and 606*b*. Thus, the misregistration has been "amplified" by the by the moiré pattern, and can be characterized by equation (2):

$$Amplification_{(y\text{-}direction)} \approx \frac{Yp_1}{dY_1}. \tag{2}$$

Figure 7:
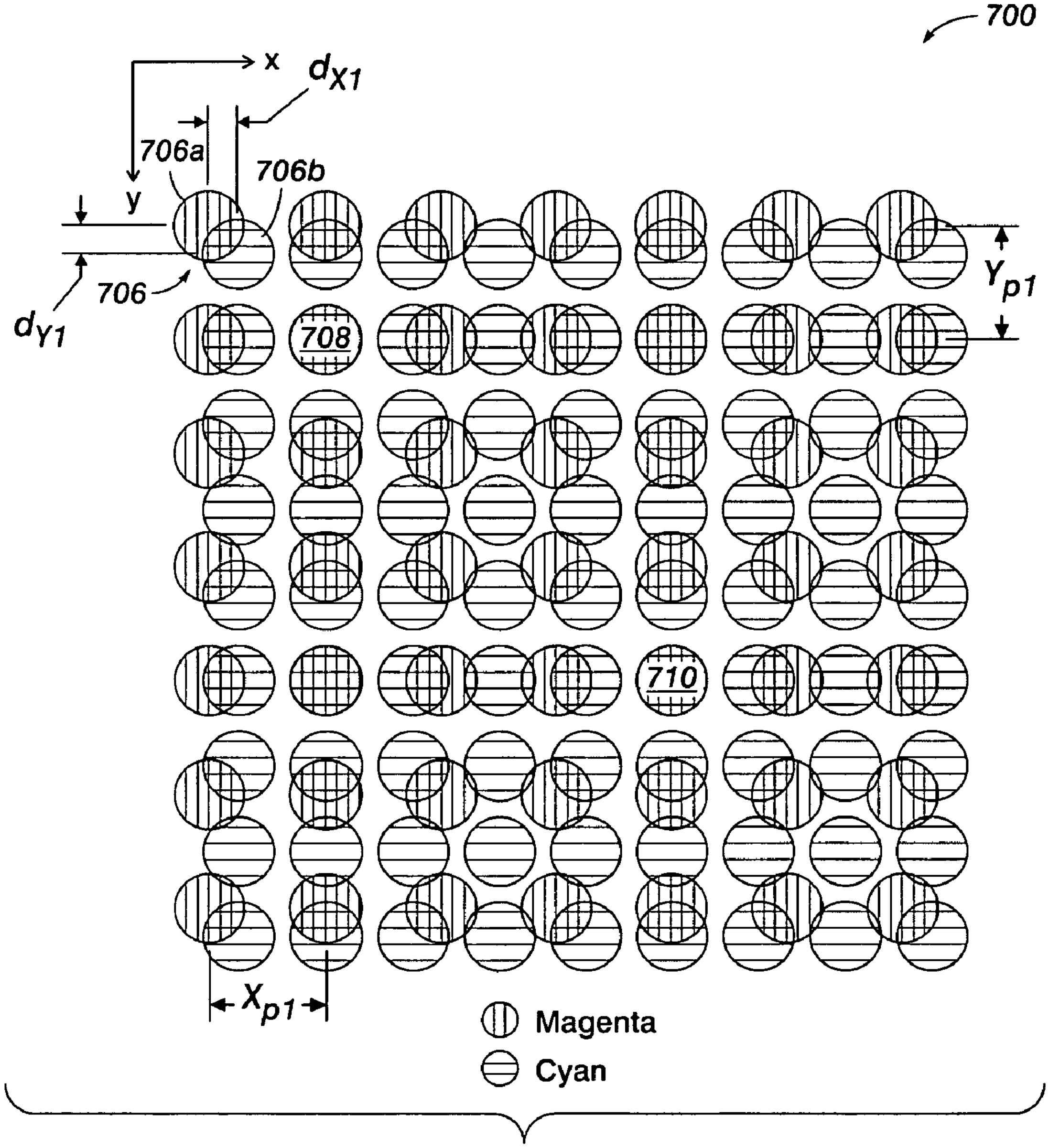
FIG. 7 is a drawing of a close-up view of a misregistration estimation patch formed by a magenta halftone pattern and a cyan halftone pattern, illustrating color separation misregistration occurring simultaneously along the x-axis and y-axis in accordance with the present disclosure.

Now refer simultaneously to FIGS. 4 and 7. Note that a color separation misregistration of the cyan halftone pattern has occurred in the x-direction by distance $dX_1$ in the x-direction, creating a moiré pattern shift in the x-direction by a distance $Xp_1$; and a color separation misregistration of the cyan halftone pattern has occurred in the y-direction by a distance $dY_1$ in the negative y direction, creating a moiré pattern shift in the negative y-direction by a distance $Yp_1$. Note that cluster-dot sets 708 and 710 are wholly overlapping, and a color separation misregistration shift has occurred distance $Yp_1$ in the negative y direction and distance $Xp_1$ in the x direction relative to cluster-dot set 408 in FIG. 4. Equations (1) and (2) are thus still valid. Also note that cluster-dot set 706 formed by cyan cluster-dot 706*b* and magenta cluster-dot 706*a*, and is partially overlapping, rather than wholly overlapping as cluster-dot set 402 in FIG. 4.

As FIGS. 4-7 illustrate, a small color misregistration can result in a large change in the moiré pattern that is formed by at least two color separations, and although FIGS. 4-7 only utilize magenta and cyan halftone patterns, any color halftone pattern colors may be used, e.g. Cyan, Yellow, Magenta, Black and/or some combination thereof. Also, color-separation misregistration estimation patches are not limited to any color space, e.g., it is within the present disclosure to form a color separation misregistration patch by using at least two colors separations of a CMYKOG color separation gamut color space.

Assume for a moment that a first halftone pattern has a halftone frequency of Fx in a frequency path that is approximately parallel to a x-axis and a halftone frequency of Fy in a frequency path that is approximately parallel to a y-axis. Also assume that a second halftone pattern has a halftone frequency of Fx+dFx in a frequency path that is approximately parallel to a x-axis and a halftone frequency of Fy+dFy in a frequency path that is approximately parallel to a y-axis. When the ratio Fx/dFx and/or Fy/dFy has a sufficiently large constant, the variation of luminance and/or chorma may be quite visible. When the two halftone patterns are used and there is a color separation misregistration between the two halftone patterns of MRx in the x-direction and MRy in the y direction, the change in the moiré pattern can be described by equations (3) and (4):

$$\text{Shift}(x\text{-direction}) \approx MRx \times \left(\frac{Fx}{dFx}\right), \tag{3}$$

and $$\text{Shift}(y\text{-direction}) \approx MRy \times \left(\frac{Fy}{dFy}\right). \tag{4}$$

Figure 8:
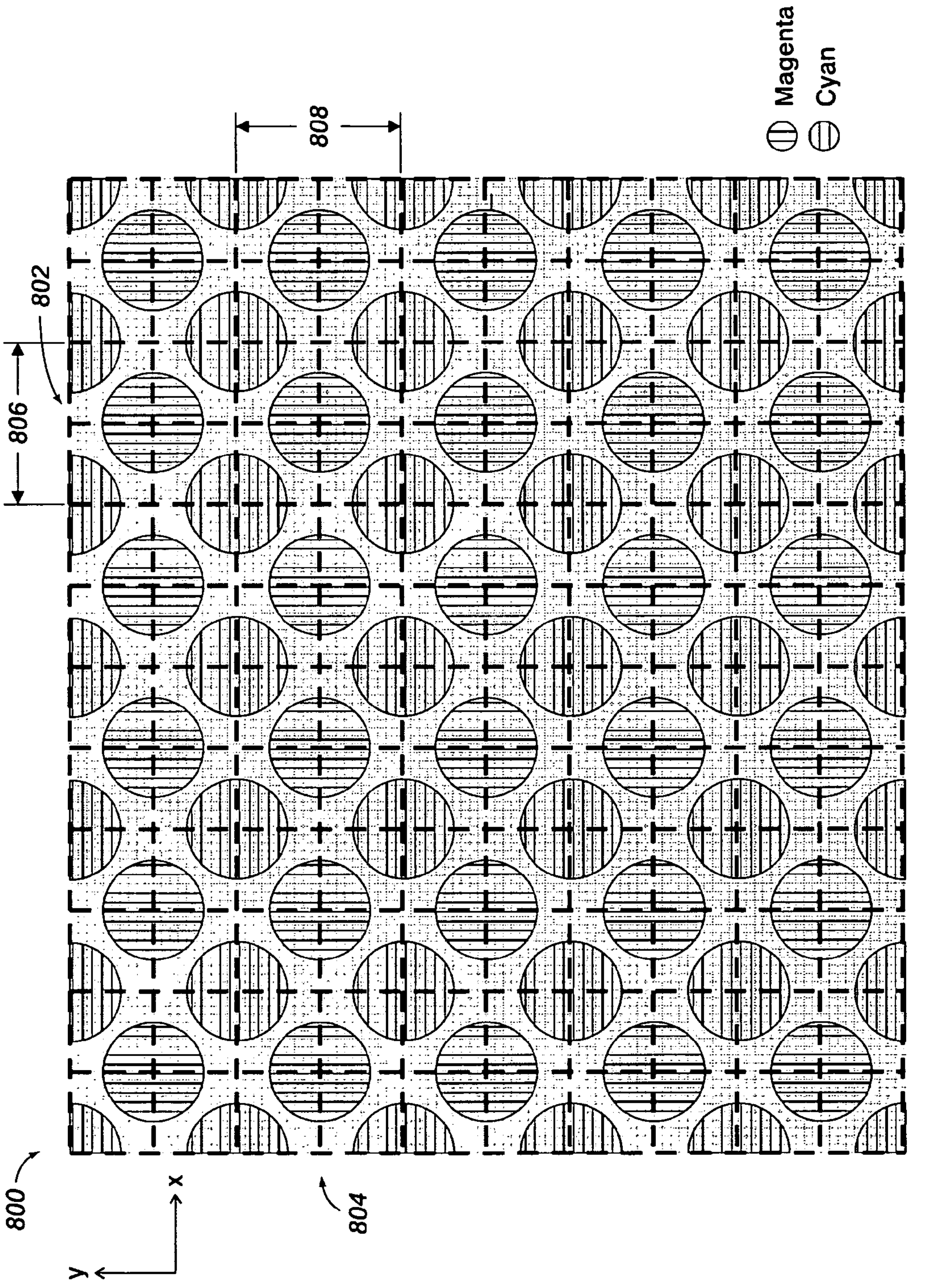
FIG. 8 is a drawing of a misregistration estimation patch in accordance with the present disclosure.

Although, the effect that a color separation misregistration has on the misregistration estimation patch on a moiré pattern from a sufficient viewing distance may not be apparent in FIGS. 4-7, the effects are more pronounced when referring to FIG. 8. FIG. 8 is a drawing rendition of a scanned photographic image of an experiment conducted using magenta frequencies of (51, 51) and (−51, 51) and cyan halftone frequencies of (50, 50) and (−50, 50) for rendering a (50% Cyan, 50% Magenta) color-separation estimation patch, where the frequencies are expressed in dots per inch. Using these halftone patterns results in a spatially varying moiré pattern that is observable by a visual inspection of FIG. 8.

FIG. 8 is a drawing rendition of a photograph of an actual hardcopy print 800 with added black grid lines to visually show how a color separation misregistration patch can detect a misregistration error. The added axis grid lines are for assisting in visually noting where the varying maximum and minimum chroma values should be located at, for example, axis 802 and axis 804 intersect at a point that should exhibit a chroma peak if no misregistration existed between the two color separations. Any misregistration should shift the chroma peak in either the x and/or y direction, and is hence detectable and may assist in estimating misregistration.

For example, if all of the chroma peaks were shifted by a value $x_1$ in the x direction and a value $y_1$ in the y direction, this shift may be a result of an aggregate color separation misregistration in the x direction of distance $x_1$ and in the y direction of distance $y_1$ between the two color separations. This example is of a color separation misregistration that exists wholly between the color separations, although the present disclosure additionally relates to detecting localized color separation misregistration. A locally shifted chroma peak and/or chroma minimum may indicate a localized misregistration. For example, if all of the chroma peak and/or chroma minimums were in the predicted location without any misregistration except for one single chroma maximums, for example the intersection of axes 802 and 804, then that shift may correspond to localized color separation misregistration.

Figure 9:
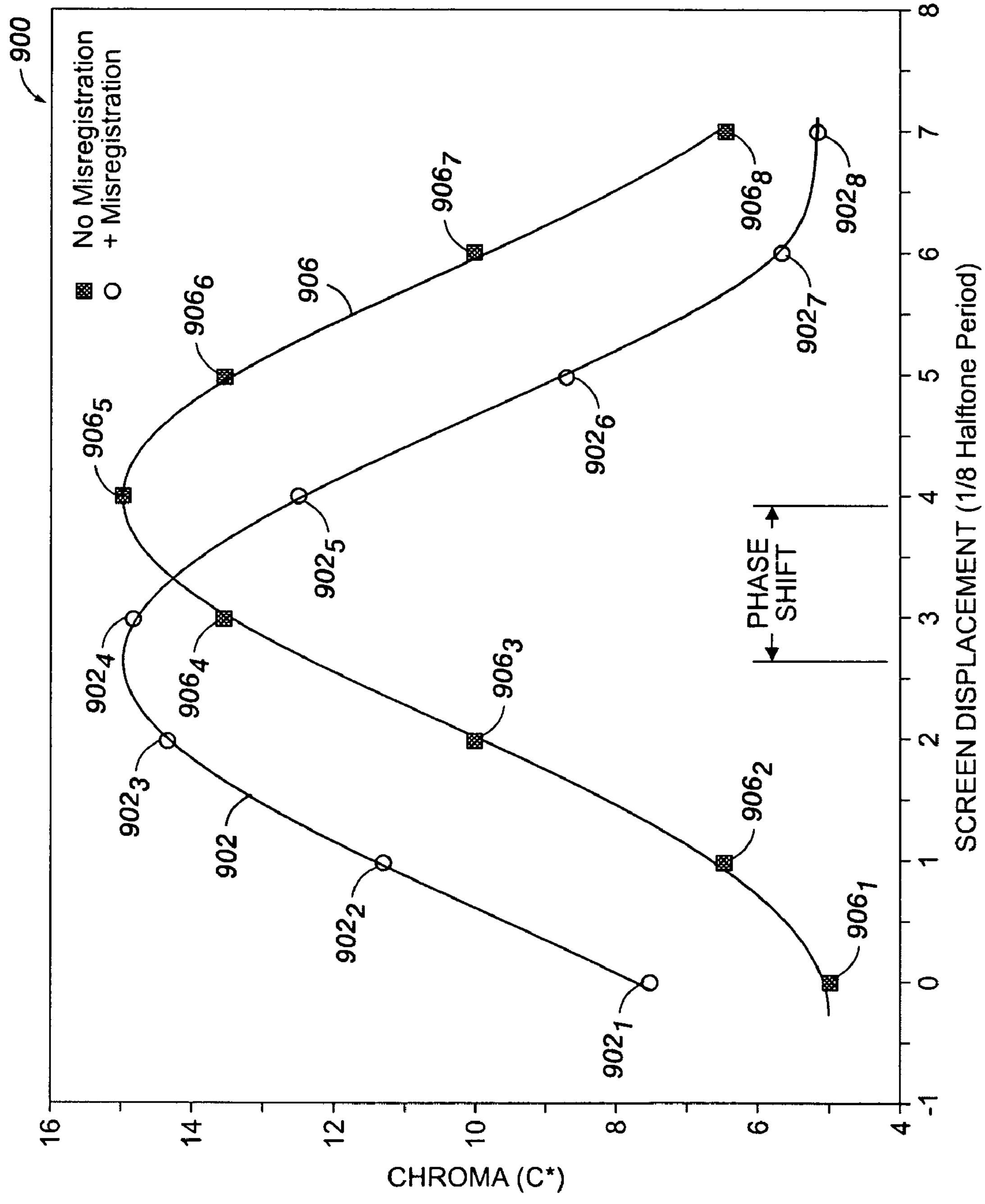
FIG. 9 is a graph of a phase shift associated with a color separation misregistration in accordance with the present disclosure.

To exemplify the relationship between a directional shift in peak chroma to a color separation misregistration, refer simultaneously to FIGS. 8 and 9. The directional shift of concern is the shift that occurs between the predicted positions and the actual and/or measured positions. Looking at axis 804 of FIG. 8 along distance 806, FIG. 9 shows the graph 900, where the x axis corresponds to a portion of axis 804 along distance 806, while the y axis of FIG. 9 corresponds to a measured and/or predicted chroma value. Referring now only to FIG. 9, data points $\mathbf{902}_1$ through $\mathbf{902}_8$ form line 904, and data points $\mathbf{906}_1$ through $\mathbf{906}_8$ form line 908. Line 908 is the predicted line that would occur if there was no color separation misregistration, while line 904 is a line that is a result of a measured chroma shift resulting from a color separation misregistration along the x-axis of FIG. 8, along axis 804.

Referring again to FIG. 8, measuring the chroma along axis 802 within distance 908, a color separation misregistration estimation may be accomplished in the y direction with the same manner as accomplished in the x direction, although the chroma measurement will be taken along axis 802 rather than axis 804.

Referring again simultaneously to FIGS. 8 and 9, although in this example shifts in chroma peaks have been illustrated, the same process may be applied to chroma minimums, luminance peaks, luminance minimums or only a segmented measurement of luminance and/or chroma, e.g. measuring only a portion of a distance of chroma may indicate where the chroma peak should occur and thus actual measuring of the chroma peak may not be necessary to measure color separation misregistration. Also, a shift of the moiré pattern and/or a change in color can indicate a color separation misregistration. Also, for example while referring to FIG. 9, data point $\mathbf{902}_4$ of line 904 may not actually be the chroma peak, but rather, the chroma peak position may be estimated by referencing data points $\mathbf{902}_1$ through $\mathbf{902}_8$.

The sensitivity of a misregistration estimation patch, such as the one shown in FIG. 8, is very strong; a misregistration of +/−250 μm may give rise to peak displacements of +/−½ inch on the substrate. Although FIG. 8 uses halftone frequencies of 50 and 51 dpi, other frequency halftones may be used to increase the sensitivity and the spatial resolution (i.e. how many positions on the page one can estimate misregistration) of the misregistration estimation. This may be accomplished by choosing halftone frequency differences greater than 1 dpi.

Referring again to FIG. 1, act 102 marks a substrate to form a misregistration patch such as the one shown in FIG. 8, then act 104 estimates the color separation misregistration of the printing system using the misregistration estimation patch that was formed during act 102. Act 104 is the act of methodology 100 that performs the analysis on a misregistration estimation patch.

As depicted within act 104, acts 110, 112 and 114 may be included. Act 110 is visualizing the misregistration estimation patch to assist in estimating the color separation misregistration. This may be accomplished with visual aides, such as the black lines that have been added to FIG. 8 and a ruler. A simple visual inspection by a human may yield valuable misregistration information that can be used to modify a printing process.

Additionally or alternatively, act 112 is measuring at least one characteristic of the misregistration estimation patch, wherein the at least one characteristic of the misregistration estimation patch is at least one of chroma, luminance, a chroma minimum, a chroma maximum, a luminance minimum and a luminance maximum. This may be accomplished visually, with the aid of photo-detectors, a photo-detector, a photodiode, a phototransistor, or a CCD. For example, a linear CCD array may sweep across a misregistration patch to measure at least one characteristic of a misregistration patch, such as the patch shown in FIG. 5 and described supra. Also described supra, by measuring a characteristic of a misregistration estimation patch misregistration information may be garnered.

Additionally or alternatively, act 114 may be included within act 104; act 114 is scanning and processing the misregistration estimation patch. This scanner may be part of a printing system; for example, consider a large scale printing system that prints a misregistration estimation patch covering an entire piece of paper by utilizing two color separations. After marking the patch, the paper may be fed into a scanning device. The device may scan the paper, thus the misregistration estimation patch, and process the scanned image to garner misregistration information. The estimated color separation misregistration may be utilized in a feed-back or feed-forward manner in the printing system. For example, a printing system may make adjustments to the laser trajectories or apply warping to digital images based upon the measured color separation misregistration. If, for example, four color separations are used within a printing system, all possible combinations of two color separations may be used to fully characterize color separation misregistration between all of the color separations and apply correction actions to compensate for the color separation misregistration.

Referring again to FIG. 1, act 116 generates a data structure representing the color separation misregistration of the printing system. During act 116, a data structure may be generated to characterize the measured color separation misregistration and/or may contain correction parameters. For example, the data structure generated may be a 2-D array (matrix) that has a data type of "vector" in each of the data elements contained within the matrix. The vector may represent a misregistration between two particular color separations while the indices of the matrix may indicate a position of the printable area of a substrate. Thus, in this example, a vector having the value of (1,2) in the location of [3,4] may indicate an average misregistration shift of 1 in the x direction and a shift of 2 in the y direction of one color separation against another at the location of 3 inches down and 4 inches across the substrate.

Additionally, the elements of the 2-D array may be extended to include additional pairs of estimated color separation misregistration between other pairs of separations, or this additional color separation misregistration information may be contained in multiple 2-D arrays within a system. In the above example, the units used are not important; but as with any digital system, quantization error must be taken into account.

Referring again to FIG. 1, acts 118, 120, and 122 may all be part of a color separation misregistration correction and/or compensating action; and these three acts may utilize the data structure generated during act 116 or, alternatively, may simply perform the act without the aid of a data structure.

Act 118 provides for adjusting trap settings, which may be include within act 104. The adjustment of trap settings may occur by manually changing a setting, such as changing a setting within image editing software and/or may be changing a setting that exists within a printing system. For example, based upon estimated color separation misregistration between two color separations, the "trap" region of two color regions of a graphic that is being printed on a substrate may need to be increased to prevent the misregistration from being noticed. A color separation that falls outside of an intended region may cause a visual artifact such as color blurring. Modifying a digital image file to account is one way to mitigate this kind of artifact.

Additionally, if a printing system does significant image processing before printing on a substrate, the printing system itself may need to define the trap regions. The trap settings may be entered into a printing system manually, and/or may automatically be modified such as in the case where methodology 100 is performed by a printing system or part of a printing system.

Act 120 provides for modifying at least one digital image file in accordance with the color separation misregistration. Act 120 may utilize the data structure generated during act 116, or may alternatively, use its own data structure or not utilize any data structure. Act 120 may include increasing trap regions, warping color separation printing regions to account for a localized color separation misregistration, and/or may otherwise change a digital image to prevent other color separation misregistration artifacts. Act 120 may occur within a printing system, may be part of image processing software, performed manually, or otherwise performed in any manner to compensate for a color separation misregistration.

For an exemplary embodiment that uses act 120, consider the following printing system: a xerographic multi-color printing system that prints high volume printing has an internal processing unit, an internal storage medium, and an internal scanner that is connected to a conveyer system. This exemplary system may have "jobs" stored within it where the jobs include a digital image file such as a raster file, vector graphics file and/or compressed image file. Before the jobs are started multiple misregistration patches may be marked; for example, an entire piece of paper may be marked by a misregistration estimation patch as described supra during act 102. The page may then be automatically fed into a scanner and scanned such as may occur during act 114.

After a misregistration estimation has been made, the page may be ejected and the process repeats until all color separation pairs are used to mark the paper. After all color separation misregistration pairs have been scanned, the data may be used to modify all of the jobs, such as during act 120. For example, based upon the misregistration estimation data obtained during act 114 and/or based upon the data structure generated during act 116, the respective trap settings may be changed, the laser trajectories may be modified, and other adjustments may be made to the digital image files located within or associated with each respective job.

Additionally or alternatively, act 120 may simply have a series of settings that modify at least one digital image file in accordance with the color separation misregistration. For example, based upon a manual or automatic estimation of the misregistration, a user may simply open a digital image file in appropriate software and make adjustments to account for the estimated color separation misregistration.

Act 122 provides for adjusting at least one mechanical setting of the printing system in accordance with the estimated color separation misregistration. For example, in high speed printing systems, some misregistration may occur because of vibrations from rapid movement of substrates (e.g. paper), moving through the system very quickly or from other mechanical sources. Vibration dampeners, feedback actuators, or other electrical/mechanical system may be able to mitigate some of color separation misregistration due to these problems. For example, in a feedback based system, the color separation misregistration may be used in a feedback loop to provide a feedback signal. The misregistration may be considered the "error" of the feedback system.

Figure 10:
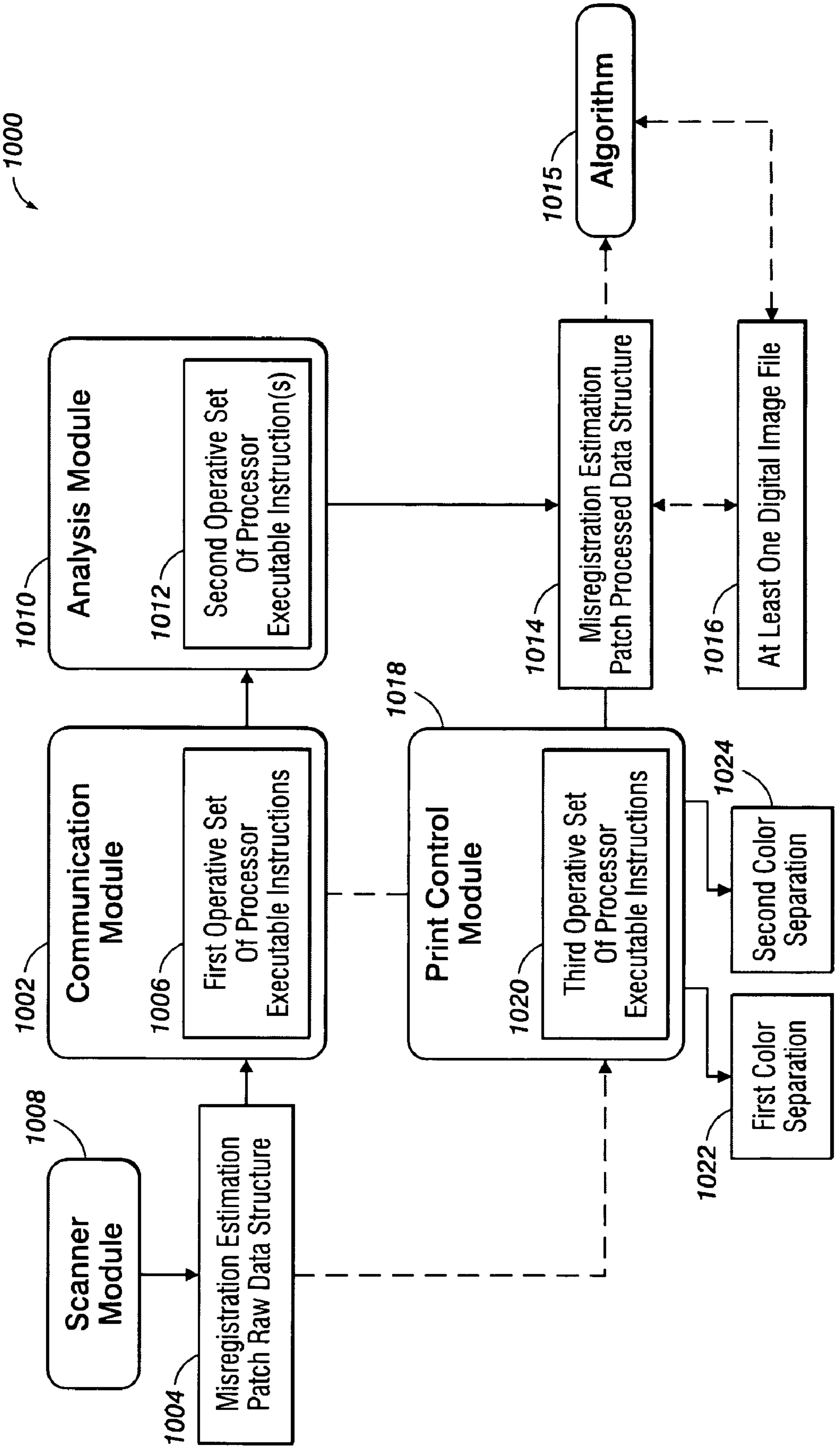
FIG. 10 is a block diagram of a color separation misregistration characterization system in accordance with the present disclosure.

Referring again to the drawings, FIG. 10 is a block diagram of a system for estimating color separation misregistration. System 1000 may be a wholly independent system, part of a computer system, a computer system, a module installable in a printing system such as an electrostatographic machine or a xerographic machine, or some combination there. The modules may be implemented in software, hardware, software in execution, a processor, a microcontroller, with the aid of memory, or some combination thereof. Additionally or alternatively, system 1000 may implement in-part or in-whole method 100 as illustrated by FIG. 1.

Communication module 1002 is shown and is the module that may provide general inter and/or intra system communications. Additionally or alternatively, misregistration estimation patch raw data structure 1002 may be communicated to communication module 1002. Misregistration estimation patch raw data structure 1004 may be a digital data representation of a misregistration estimation patch, e.g. a image file, gathered data about a patch, and/or a data structure that has undergone some preliminary pre-processing, e.g. data compression.

Communication module 1002 may contain a buffer, a serial data connection, a parallel data connection, a physical connection e.g. a metallic connector, or any other hardware and/or software so that operative communication is possible. Additionally or alternatively, communication module 1002 may contain first operative set of processor executable instructions 1006. First instructions 1002 may be software that controls communications inter- and/or intra-system 1000. For example, communication module 1002 may have an Ethernet connection, such as an RJ-45 female connector, while the first operative set of processor executable instructions instruction 1006 may contain software to transmit and receive TCP/IP packets and/or an IEEE 802.3 based packets.

System 1000 may further include scanner module 1008. Scanner module 1008 may be a scanner, an interface to a scanner, a scanner section of a larger printing system (e.g. a scanner that can automatically take paper samples off of a high speed printing system) or otherwise any device that can measure at lease one characteristic of a misregistration estimation patch. Scanner module 1008 may scan a misregistration estimation patch that was formed on a substrate and generate misregistration estimation patch raw data structure 1004 that may be operatively communicated to communication module 1002. Scanner module 1008 may contain hardware, software, circuitry, electrical components, mechanical components or some combination thereof to generate misregistration estimation patch raw data structure 1004.

System 1000 may further include analysis module 1010 that may include second operative set of processor executable instructions 1012. Analysis module 1010 may be operatively connected to communication module 1002 and may receive the misregistration estimation patch raw data structure 1004 from communication module 1002. Additionally, analysis module 1010 may process misregistration estimation patch raw data structure 1004 and generate misregistration estimation patch processed data structure 1014. The misregistration estimation processed data structure 1014 may correspond to a color separation misregistration.

Analysis module 1010 may generate misregistration estimation patch processed data structure 1014 by measuring at least one characteristic of a misregistration estimation patch by utilizing misregistration estimation patch raw data structure 1004. The characteristic processed by analysis module 1010 may include color, chroma, luminance, a chroma minimum, a chroma maximum, a luminance minimum and/or a luminance maximum, and/or a shift of the moiré pattern.

Additionally or alternatively, data structure 1014 may include information that may be utilized by at least one digital image file 1016 and/or algorithm 1010. For example, algorithm 1010 may utilize data structure 1014 to determine what kinds of modification may be made to at least one digital image file 1016 to account for the color separation misregistration. Trapping regions, boundary regions, color separation warping, modifying page position, or other corrective action may be made by modifying at least one digital image file 1016 so that successive images account for the color separation misregistration.

Also data structure 1014 may be utilized by print control module 1018. Module 1018 may include a third operative set of processor executable instructions 1020 to control the marking of a color separation misregistration estimation patch. Module 1020 may use first color separation 1022 and second color separation 1024 to control the marking of a color separation misregistration estimation patch. Also, the print control module 1018 may communicate with data structure 1014, communication module 1002 and/or may also read misregistration estimation patch raw data structure 1004 to assist in controlling the marking of a color separation misregistration estimation patch.

The data output from data structure 1014 and the at least one digital image file 1016 are provided to algorithm 1015 for processing.

Print control module 1018 may be especially useful when system 1000 is an installable module installable in a printing system such as electrostatographic machine or a xerographic machine. System 1000 may be a stand alone system that operates independently with respect to another printing system.

It will be appreciated that variations of the above-disclosed and other features and functions, or alternatives thereof, may be desirably combined into many other different systems, methods and/or applications. Also that various presently unforeseen or unanticipated alternatives, modifications, variations or improvements therein may be subsequently made by those skilled in the art which are also intended to be encompassed by the following claims.

What is claimed is:

1. A system for estimating color separation misregistration, comprising: a communication module having a first operative set of processor executable instructions, wherein the communication module is configured to receive a misregistration estimation patch raw data structure relating to a misregistration estimation patch marked on a substrate, the misregistration estimation patch being formed by first and second color separations, the first color separation marking the substrate with a first halftone pattern having a first halftone-frequency vector in a first direction and a second halftone-frequency vector in a second direction, the second color separation marking the substrate with a second halftone pattern having a first halftone-frequency vector in a first direction and a second halftone-frequency vector in a second direction, wherein the first and second halftone patterns form a moiré pattern, wherein deviation in at least one of said at least one of the halftone frequency paths and the moire pattern is indicative of a color separation misregistration; and an analysis module having a second operative set of processor executable instructions, wherein the analysis module is operatively connected to the communication module, the analysis module being configured to estimate color separation misregistration by processing the misregistration estimation raw data structure and generating a misregistration estimation processed data structure corresponding to a characterization of the color separation misregistration.

2. The system according to claim 1, further comprising: a printing control module having a third operative set of processor executable instructions, wherein the printing control module is configured to control the marking of the misregistration estimation patch on the substrate by utilizing the first and second color separations.

3. The system according to claim 1, wherein the analysis module processes the misregistration estimation raw data structure by measuring at least one of color, chroma, luminance, a chroma minimum, a chroma maximum, a luminance minimum, a luminance maximum and a moire pattern shift of the misregistration estimation patch marked on the substrate as provided in the misregistration estimation raw data structure.

4. The system according to claim 1, wherein the misregistration estimation processed data structure is configured to be utilized in an algorithm, wherein the algorithm is configured to modify at least one digital image file in accordance with the estimated color separation misregistration.

5. The system according to claim 1, the misregistration estimation processed data structure is configured to provide at least one mechanical setting adjustment of the printing system in accordance with the estimated color separation misregistration.

6. The system according to claim 1, wherein the misregistration processed data structure is configured to provide trap settings of the printing system in accordance with the estimated color separation misregistration.

7. The system according to claim 1, further comprising: a scanner module configured to scan the misregistration estimation patch to generate the misregistration estimation raw data structure, the scanner module being further configured to operatively communicate the misregistration estimation raw data structure to the communication module.

8. The system according to claim 1, wherein the system is configured to be a module installable in an electrostatographic machine or a xerographic machine.

* * * * *